June 18, 1968 D. F. PRZYBYLSKI 3,388,819

MATERIAL HANDLING MACHINE

Original Filed April 4, 1966

INVENTOR.
DANIEL F. PRZYBYLSKI
BY
ATTORNEYS

June 18, 1968  D. F. PRZYBYLSKI  3,388,819
MATERIAL HANDLING MACHINE

Original Filed April 4, 1966

INVENTOR.
DANIEL F. PRZYBYLSKI
BY
ATTORNEYS 3,388,819
MATERIAL HANDLING MACHINE
Daniel F. Przybylski, Winona, Minn., assignor to The Warner & Swasey Company, Cleveland, Ohio, a corporation of Ohio
Original application Apr. 4, 1966, Ser. No. 540,014. Divided and this application Sept. 20, 1967, Ser. No. 669,062
6 Claims. (Cl. 214—138)

ABSTRACT OF THE DISCLOSURE

A material handling machine includes a boom member carried on a boom support. A hydraulic power means is utilized to effect pivoting movement of the boom in a substantially vertical plane relative to the boom support. The hydraulic power means is pivotally connected to the boom at a point below the boom pivot axis. The boom is carried by a link member which, in turn, is pivotally carried by the boom support. The link member may be moved by a power means in order to effect relative movement of the boom pivot axis and the hydraulic power means.

---

The application is a divisional of U.S. application Ser. No. 540,014, filed on Apr. 4, 1966, and assigned to the assignee of the present invention.

The present invention relates to a material handling machine, and particularly relates to a material handling machine, such as a backhoe, which includes a boom member having a dipper stick pivotally connected to the end of the boom member, and wherein the boom member is pivotally connected to a support for pivotal movement about a horizontal axis and power means which acts between the boom and the support for effecting vertical pivotal movement of the boom.

Known material handling machines, such as backhoe, include a boom carried by a support for pivotal movement in a substantially vertical plane about a horizontal axis. The vertical movement or stroke of the boom about the horizontal pivot axis is effected by a power means. The power means moves the boom at a particular speed and power providing a boom stroke having a particular speed-power relationship. Preferably, in known material handling machines, the power means includes a hydraulic cylinder and piston rod. The hydraulic cylinder is generally connected for pivotal movement about a horizontal axis to the support and the outer end of the piston rod is generally pivotally connected to the boom so as to provide for the necessary relative movements between the piston rod and boom, on the one hand, and the hydraulic cylinder and support, on the other hand, as the boom moves vertically about the horizontal pivot axis.

The boom generally carries on its outermost end a dipper stick equipped with a suitable tool for performing some operation. Commonly, the tool is a bucket for effecting digging or movement of some material. These machines, however, are effective to perform numerous different operations, depending upon the use of the tool supported on the end of the boom, and may be capable of lifting and/or carrying heavy loads. Due to the various uses for these machines, the lifting and/or digging power requirements for the boom vary. Moreover, the desired speed of vertical movement of the boom also varies.

In accordance with the present invention, there is provided a new and improved material handling machine having a boom carrying a dipper stick and wherein the boom is movable in a vertical plane by a power means and wherein the speed-power relationship for boom movement may be controlled and varied within limits. This provides for rapid boom movement when handling light loads requiring little power, and also provides for handling heavy loads requiring greater power but at a low speed. The ability to vary the speed-power relationship does provide a material handling machine of greater versatility and efficiency.

Accordingly, the principal object of the present invention is the provision of a new and improved material handling machine having a boom carrying a dipper stick and wherein the boom is pivotal about a horizontal axis by power means and which is constructed and arranged so that the speed-power relationship for boom movement may be controlled through a wide range whereby the boom may be readily moved either through a power stroke at a relatively low rate of speed or through a speed stroke at a relatively high rate of speed but at less power.

A still further object of the present invention is the provision of a new and improved material handling machine having a boom supported for pivotal movement about a horizontal axis by a support and wherein the boom pivot is carried on a member which may be moved relative to the support upon actuation of a hydraulic cylinder acting between the boom and member and including a lift cylinder pivotally connected to the boom at a point spaced from the boom pivot point so as to effect vertical movement of the boom through speed and power strokes depending upon the position of the member carrying the boom pivot.

Further objects and advantages of the present invention will be apparent to those skilled in the art to which it relates from the following detailed description of the preferred embodiment thereof made with reference to the accompanying drawings forming a part of this specification and in which.

The present invention provides an improved material handling machine having a boom movable in a vertical plane about a substantially horizontal axis and wherein the movement of the boom is effected by a power means. The present invention is adapted for use in any type of material handling machine which incorporates such a boom and is particularly adapted for use in a material handling machine which has varying demands with regard to speed of boom movement and power capability of the boom.

Figure 1:
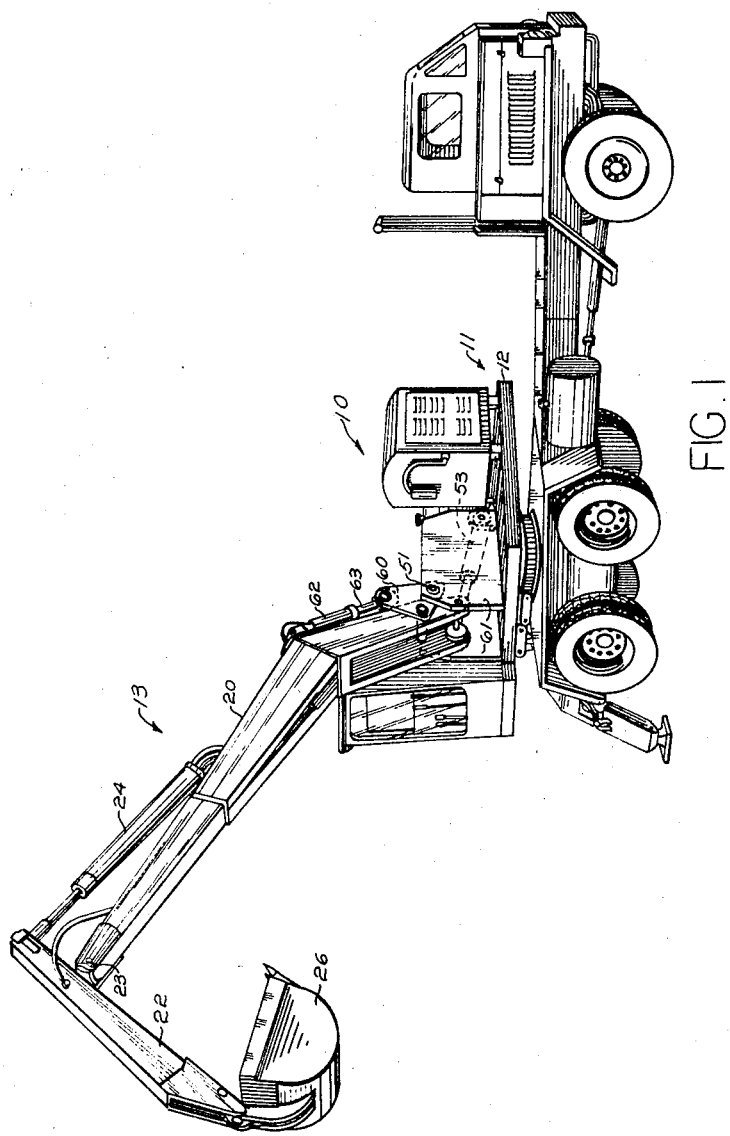
FIG. 1 is a schematic perspective view of a material handling machine embodying the present invention.

As representing the preferred embodiment of the present invention, FIG. 1 illustrates a material handling machine 10. The material handling machine 10 includes a support carrier 11 which carries a support platform 12. The support platform 12 is rotatable about a substantially vertical axis and carries a boom structure 13. The boom structure 13 is supported for pivotal movement about a horizontal axis 51 and is pivoted about the horizontal axis 51 by a power means 53.

The boom structure 13 includes a boom member 20 which is pivotally supported for movement about the axis 51 by pivot pin means which extends through a pair of spaced support frame members 61 secured to the platform 12. Upon actuation of the power means 53, the boom 20 moves relative to the support platform 12 and support frame members 61. The boom 20 on its outermost end carries a dipper stick 22 for pivotal movement relative to the boom 20. The dipper stick 22 may be pivoted about a pivot axis 23 by a hydraulic cylinder 24. The outermost end of the dipper stick 22, of course, carries a suitable material handling implement, a digging bucket 26, as shown in the drawing and which is suitably actuated by a hydraulic power means (not shown) in a conventional manner.

The power means 53 for effecting vertical movement of the boom is preferably a hydraulic power means including a cylinder and a piston rod pivotally connected at its outer end to the boom 20 at a location below the pivot axis 51 for the boom 20. The piston rod is pivotal relative to the boom about a pivot axis 55. The piston rod, when it moves, applies a force to the boom 20 to effect movement thereof.

In accordance with the present invention, the material handling machine 10 is constructed so that the speed-power relationship for boom movement can be varied. Thus, the boom 20 may be moved at different speeds and have different lifting capabilities. The speeds and power capabilities can be varied over a substantial range, and at one limit the boom can move through a speed stroke wherein the boom moves through a wide range of movement at a relatively fast speed, while at the other limit, the boom 20 moves through a power stroke wherein the boom moves through a lesser range of movement than the speed stroke but is capable of handling greater loads.

During the speed stroke, the power means 53 applies a given force to the boom to effect movement thereof about the pivot axis 51, whereas during the power stroke the hydraulic mechanism applies a greater effective force to the boom to effect movement of the boom about the pivot axis 51. In view of the fact that a greater effective force is applied to the boom for movement about the pivot axis, the boom is capable of handling greater loads during the power stroke.

The fact that the speed-power relationship for boom movement can be varied enables the material handling machine 10 to be utilized highly effectively and with a great flexibility. The boom is of course capable of moving at higher rates of speed through a wider range of movement, thereby enabling light loads to be handled relatively quickly and through a wide range of movement. The fact that the boom is capable of moving through a power stroke enables the mechanism to be utilized for digging in relatively hard ground and more readily enables the material handling machine to be utilized for lifting heavier loads.

Figure 2:
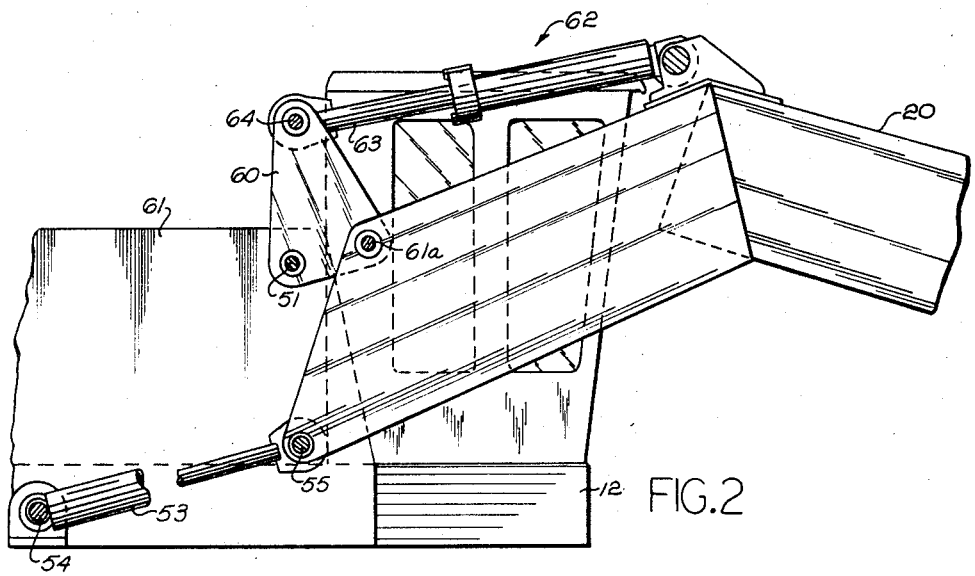
FIG. 2 is a detailed view of a portion of the material handling machine shown in FIG. 1.

The boom 20 is carried by a support plate 60 and the boom pivot axis 51 comprises the axis of a pin connected with the support plate 60. The support plate 60 is pivotally connected to a support frame member 61 by the pin for pivotal movement relative thereto about the axis 51 upon the movement of the boom 20. The boom 20 is pivotally connected to the support plate 60 for pivotal movement relative thereto about an axis 61a. The support plate 60 may be pivoted about the axis 51 independent of boom movement by a hydraulic cylinder means 62 which is suitably carried on the upper side of the boom, as shown in FIG. 2, and which includes a piston rod 63 pivotally connected to the upper end of the support plate 60 at 64.

The hydraulic cylinder or power means 62 and the link connecting plate 60 comprise a means for selecting and adjusting the relative location of the boom pivot axis 51 and the axis 55 where the lifting force is applied to the boom and determines the speed-power relationship. When the cylinder 62 is actuated and the parts are in the position shown in FIG. 2, the boom is moved through a speed stroke upon energization of the hydraulic cylinder 53. When the cylinder 62 is not actuated, the boom moves through its power stroke.

Figure 3:
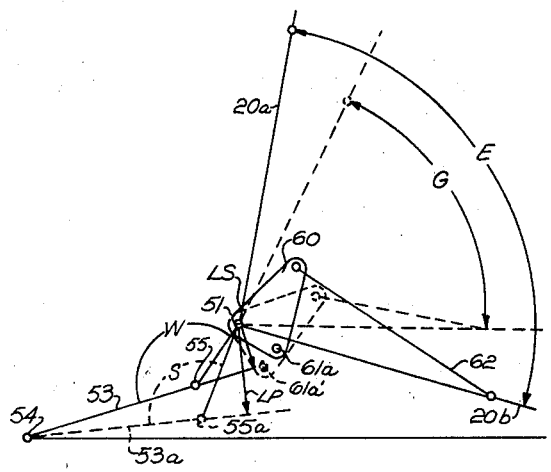
FIG. 3 is a view illustrating schematically the mechanism shown in FIG. 2.

Referring now to FIG. 3 wherein the parts are indicated schematically by lines, when the parts are as shown in full lines in FIG. 3, that is adjusted so that boom 20 moves through its speed stroke, the boom moves from its highest position 20a to its lowest position 20b through an angle designated E. When the cylinder 62 is de-energized, the axis 61a moves downwardly to position 61a'. This also causes movement of the cylinder 53 somewhat to position 53a and moves axis 55 to position 55a. Moreover, when so moved, the angle that the force applied by the hydraulic mechanism 53 forms with a line through the pivot axes 51 and 55 is more nearly normal, i.e., the angle S is closer to 90° than the angle W, and thus a greater force is applied by the hydraulic mechanism 53 to the boom to effect movement of the boom. Moreover, a longer lever arm for the boom lifting force is provided. The lever arm LS is substantially shorter than the lever arm LP. In this position, the boom is moved through its power stroke when cylinder 53 is actuated.

The boom when it moves through its power stroke, is moved through a smaller range of movement than when it is moved through its speed stroke. The range of movement in the power stroke is shown schematically and designated angle G in FIG. 3. The movement of the boom through the power stroke completely overlaps and is contained completely within the limits of the speed stroke movement. Intermediate positions of the pivots 61a and 55 provide for intermediate speed-power relationships.

It should be apparent from the above that the preferred embodiment of the present invention has been described in considerable detail, but that certain modifications, changes, and adaptations may be made therein by those skilled in the art to which it relates, and it is hereby intended to cover all such modifications, changes, and adaptations thereof which fall within the scope of the appended claims.

Having described my invention, I claim:

1. A material handling machine comprising platform means, at least one boom support member having a pivotal interconnection with said platform means providing a boom pivot axis, a boom carried by said boom support member, power means acting between said boom member and said platform means for effecting pivotal movement of said boom member about said boom pivot axis relative to said platform means, an interconnection between said boom and said support member and providing for relative movement of said boom relative to said boom support member to vary the relative positions of said boom pivot axis and said power means.

2. A material handling machine as defined in claim 1 wherein said interconnection between said boom and said support member is a pivotal interconnection providing for relative pivoting movement of said boom and said support member.

3. A material handling machine as defined in claim 1 further including additional power means for effecting relative movement of said boom support member and said boom member.

4. A material handling machine as defined in claim 1 wherein said power means comprises a hydraulic cylinder mechanism pivotally connected to said boom member and pivotally connected to said support means.

5. A material handling machine comprising platform means, a boom carried by said platform means, means supporting said boom for pivotal movement relative to said platform means about a boom pivot axis, a hydraulic power means acting between said boom and said platform means for selectively effecting pivotal movement of said boom, said hydraulic power means comprising a hydraulic lift cylinder pivotally connected to said platform means and a piston rod pivotally connected with said boom, said means supporting said boom comprising at least one support link member pivotally connected to said boom and to said platform means, said pivotal interconnection of said platform means and said link member comprising said boom pivot axis, and hydraulic power means for effecting pivotal movement of said link member relative to said boom to vary the location of said boom pivot axis relative to said pivotal interconnection of said piston rod to said boom.

6. A material handling machine as defined in claim 5 wherein said hydraulic power means acts between said boom and said link member.

No references cited.

HUGO O. SCHULZ, *Primary Examiner.*